(12) United States Patent
Fukuzawa (10) Patent No.: US 7,756,397 B2
(45) Date of Patent: Jul. 13, 2010

(54) VIDEO TRANSMISSION SYSTEM

(75) Inventor: Keiichi Fukuzawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1173 days.

(21) Appl. No.: 10/703,602

(22) Filed: Nov. 10, 2003

(65) Prior Publication Data

US 2004/0101276 A1    May 27, 2004

(30) Foreign Application Priority Data

Nov. 22, 2002    (JP)    ............... 2002-339813

(51) Int. Cl.
*H04N 7/087* (2006.01)
(52) U.S. Cl. .................. 386/84; 386/46; 386/125
(58) Field of Classification Search ............ 386/46
See application file for complete search history.

(56) References Cited

U.S. PATENT DOCUMENTS

| | | | | |
|---|---|---|---|---|
| 6,243,395 B1 * | 6/2001 | Fujimori et al. | ............. | 370/466 |
| 6,618,549 B1 * | 9/2003 | Kato et al. | ............. | 386/94 |
| 6,732,200 B1 * | 5/2004 | Aoki | ............. | 710/60 |
| 6,763,037 B1 * | 7/2004 | Yanagihara et al. | ......... | 370/473 |
| 7,035,272 B2 * | 4/2006 | Nomura | ............. | 370/412 |

FOREIGN PATENT DOCUMENTS

| | | |
|---|---|---|
| JP | 10-190742 | 7/1998 |
| JP | 2000-183956 | 6/2000 |

* cited by examiner

*Primary Examiner*—Marsha D Banks Harold
*Assistant Examiner*—Christopher Findley
(74) *Attorney, Agent, or Firm*—Fitzpatrick, Cella, Harper & Scinto (57) ABSTRACT

In order to avoid disturbance in synchronization establishment at the time of data transmission in a system includes different communication protocols (e.g., a DV system and a MPEG system), a transmission system side which complies with a plurality of communication protocols, includes a reproduction phase control unit for generating common synchronization information which can be shared among the plurality of communication protocols; and a transmission packet processing unit for multiplexing the common synchronization information generated by the reproduction phase control unit with information to be transmitted and for transmitting the resultant information to a reception apparatus, and a recording system side includes a recording control unit for controlling data recording operation according to the common synchronization information.

19 Claims, 5 Drawing Sheets

VIDEO TRANSMISSION SYSTEM

BACKGROUND OF THE INVENTION

1. Field of the Invention

The present invention relates to a video transmission system using a communication technology complying with a plurality of communication protocols.

2. Related Background Art

As an apparatus capable of picking up, recording, and reproducing images, there is a camera built-in digital video recorder. As a camera-integrated digital video recorder for consumer use, products for recording and reproducing digital image data of the DV system are known. Such digital image data of the DV system are compressed and encoded using intraframe compression.

On the other hand, as a recording apparatus capable of receiving, recording, and reproducing TV broadcasts, products using the Moving Picture Experts Group (MPEG) system are known, which employ interframe compression as a compression encoding method for digital image data.

Digital image data of the DV system or the MPEG system can be transmitted between different apparatuses with isochronous transfer using an IEEE 1394 serial bus. The isochronous transfer of the DV system is standardized with the AV protocol of the DV transmission standard (IEC 61883, Part 2), and the isochronous transfer in the MPEG system is standardized with the AV protocol of the MPEG transmission standard (IEC 61883, Part 4).

The detail of the camera-integrated digital video recorder for recording and reproducing digital image data of the DV system is standardized with the Standard Definition (SD) format (Part 2) which is included in the DVCR formats (IEC 61834). For example, the SD format defines a configuration for helical-scan recording on a 6.35 mm-wide Mini DV Cassette. The DVCR formats also include standards for the Digital Video Broadcasting (DVB) format (Part 9) and the Advanced Television (ATV) format (Part 10) for recording compressed data of the MPEG system onto a Mini DV Cassette. In other words, the DVCR formats are applicable to a system capable of recording compressed image data both of the DV system and the MPEG system.

The simplest way of dubbing operation using a digital video system composed of a plurality of apparatuses configured on the basis of those DVCR formats is attained by connecting two digital video recorders via a digital interface such as IEEE 1394, to reproduce an original tape of a transmission side while transferring the original tape to a reception apparatus, and to record the received data on another tape of a reception side.

In such a case, in order to record the data of the original tape faithfully at the copy destination, the system of the transmission side must be synchronized with the system of the reception side. Lack of this synchronization may lead to troubles at the reception side such as buffer overflow and recording of data on a location different from the original tape.

Figure 2A:
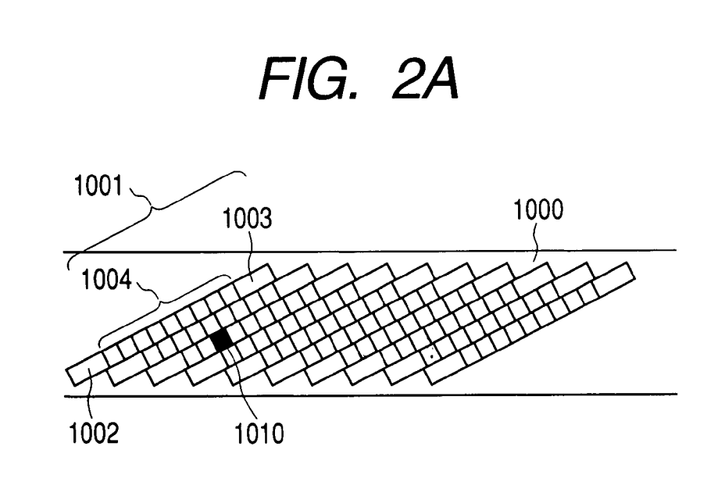
FIG. 2A is a diagram depicting conceptually how digital image data are recorded on a tape of a transmission side.
Figure 2B:
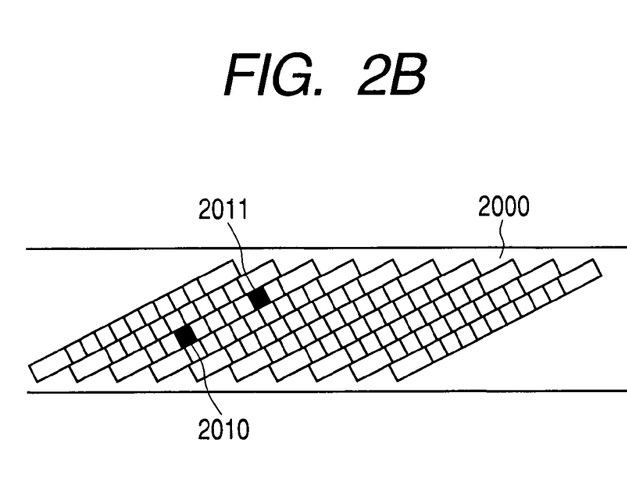
FIG. 2B is a diagram depicting conceptually how digital image data are recorded on a tape of a reception side.

The above problems will be specifically described with reference to FIGS. 2A and 2B. FIGS. 2A and 2B both conceptually show how the compressed digital image data are recorded on a tape. FIG. 2A shows a situation of recording at the transmission side, and FIG. 2B shows a situation of recording at the reception side.

In FIG. 2A, reference numeral 1000 denotes an original tape of the transmission side. Reference numeral 1001 denotes a recording track for data recorded on the tape 1000 by a helical-scan head. Laterally arrayed continuous recording tracks as shown in FIG. 2A are formed by conveying the tape 1000. The recording track is formed of areas 1002, 1003 for error correction, and an area 1004 for recording packetized encoded compressed data. Image data, or the like are recorded in the area 1004, with being divided into a plurality of pieces of a predetermined sync block length.

In FIG. 2B, reference numeral 2000 denotes a tape for recording of the reception side. Data to be recorded will be recorded on the tape 2000 in the same manner as in FIG. 2A.

Here, as described above, in the case where the system of the transmission side and the system of the reception side are not synchronized with each other, if the data recorded in the area 1004 at the transmission side are digitally transmitted, then the recording system of the reception side may not operate in time and cause its buffer to overflow (buffer overflow), or on the contrary, may run short of data to be recorded (buffer underflow). This may cause an error of failing to record a predetermined number of data on the tape of the reception side.

Even in the case where the variation of the transmission rate takes place within a range in which no buffer overflow occurs, if the system of the transmission side has a different phase from that of the system of the reception side, then data 1010, for example, in the area 1004 of the transmission side, which are to be recorded at a location 2010 of the reception side, will be recorded at an offset location such as 2011, owing to the influence of the phase shift.

For the DVCR formats, special reproduction is standardized so that the recording may be conducted in a predetermined pattern in consideration of the scan pattern of the head. Displacement of the recorded location of packet data can thus be a fatal recording error.

To avoid such various errors, synchronization should be established at the time of dubbing so that reference clocks may be adjusted between the system of the transmission side and the system of the reception side.

Among the DVCR formats, in the DV system, such synchronization is established by using time stamp information. Since this time stamp information is generated from a predetermined frame change point due to the recorded tape pattern in the reproducing system of the transmission side, the frame change point becomes reference data for the tape location (synchronization is established between the reproducing system and the transmitted data).

On the other hand, the reception side is controlled so that the reference of the recording system is adapted to a change point timing of the frame data reconstructed from the time stamp information (synchronization is established between the received data and the recording system). Therefore, a timing of the system on the transmission side, a timing of the system of the reception side, and a timing of the transmission/reception system for digital data are synchronized with one another, and thereby the tape pattern in the system of the transmission side is faithfully reconstructed as the tape pattern in the system of the reception side.

With regard to the synchronization system in the MPEG system among the DVCR formats, a synchronization signal (corresponding to the time stamp information in the DV system) is communicated in a packet configuration in consideration of asynchronous ATM communication. Specifically, information on the cycle count and cycle offset located in the least significant 25 bits of a source packet header is communicated as the synchronization signal. While the packet location where the synchronization signal is embedded, and the bit length of the synchronization signal are different from those for the DV system, synchronization is established basically in the same way as in the DV system.

However, comparing the DV system with the MPEG system, although the systems have the same basic synchronization algorithm at the time of transmission for dubbing, or the like, the formats are considerably different from each other in the location and bit length of the time stamp information required for synchronization. For example, in the case where the system of the transmission side reproduces a tape for dubbing on which data in the DV system and data in the MPEG system are recorded in a mixed manner, the data in both systems will also be recorded in a mixed manner on another tape in the system of the reception side. This is expected to cause a problem of disturbed synchronization due to the switch of processing for synchronization signals at the time of switching the systems during the dubbing operation.

SUMMARY OF THE INVENTION

An object of the present invention is to solve the above-described problems.

Another object of the invention is to avoid disturbance in synchronization establishment in the case where communications according to different communication protocols (for example, the DV system and the MPEG system) are mixed.

As a preferred embodiment for such objects, a video transmission system of the present invention, which complies with a plurality of communication protocols, comprising: synchronization information generation means for generating synchronization information which can be shared among the plurality of communication protocols; transmission means for transmitting communication data with the synchronization information generated by the synchronization information generation means being multiplexed with video data; and recording control means for controlling recording operation for the video data according to the synchronization information.

Alternatively, a video data transmission apparatus of the present invention comprising: input means for inputting video data; synchronization information generation means for generating synchronization information which can be shared among a plurality of communication protocols; and transmission means for outputting encoded data with the synchronization information generated by the synchronization information generation means being multiplexed with the video data.

Alternatively, a video data recording apparatus of the present invention comprising: reception means for receiving encoded data in which video data are multiplexed with synchronization information which can be shared among a plurality of communication protocols; detection means for detecting the synchronization information from the encoded data which is received; recording means for recording the video data; and recording control means for controlling recording operation of the recording means based on the synchronization information detected by the detection means.

Still other objects of the present invention, and the advantages thereof, will become fully apparent from the following detailed description of the embodiments.

DESCRIPTION OF THE PREFERRED EMBODIMENTS

The preferred embodiments of the present invention will now be described in detail hereinafter with reference to the accompanying drawings.

Figure 1:
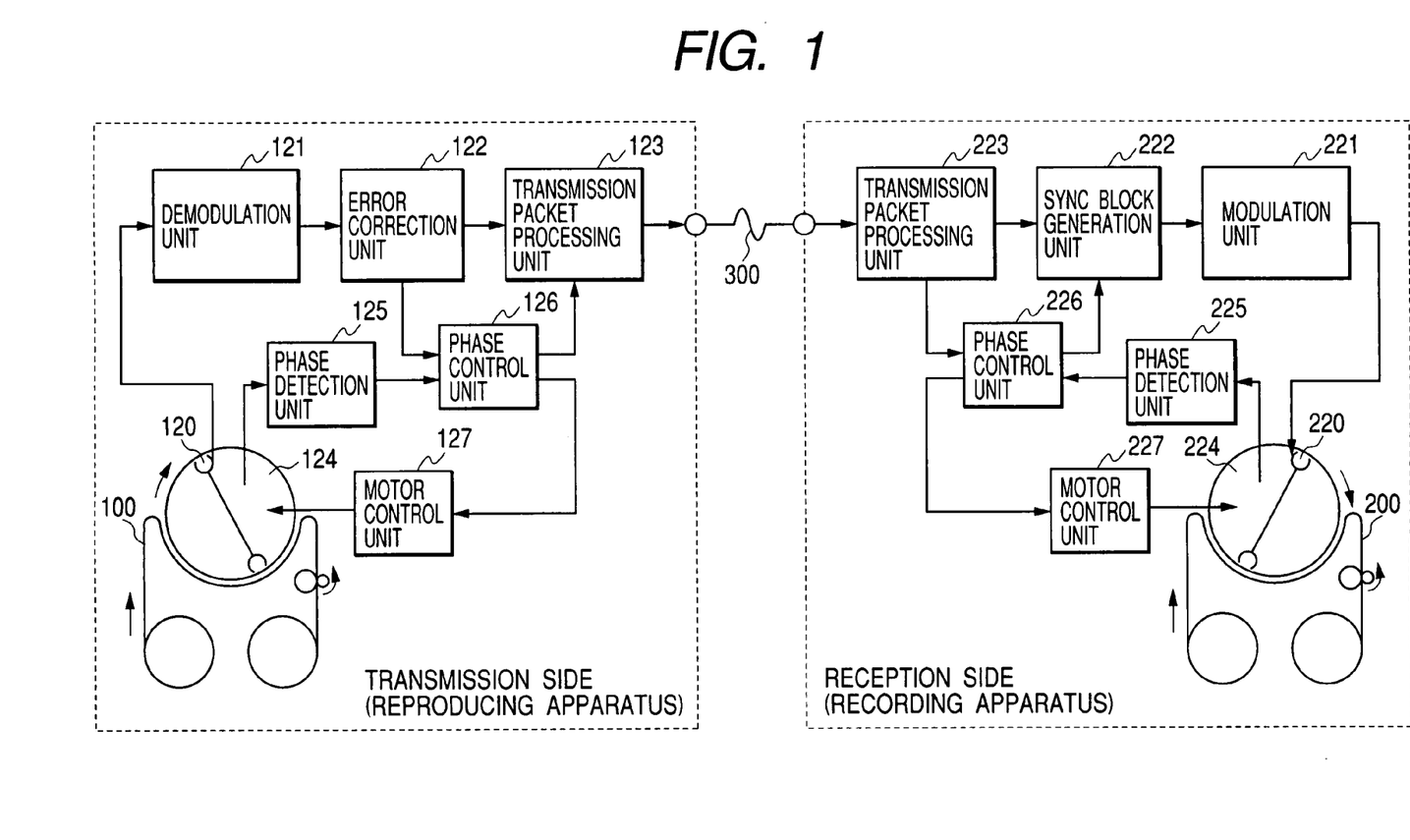
FIG. 1 is a block diagram depicting a configuration of a video transmission system according to the present invention.

FIG. 1 is a block diagram showing schematically a configuration of an embodiment of a video transmission system according to the present invention. As shown in FIG. 1, the video transmission system of the present embodiment is constructed by a reproducing apparatus of the transmission side and a recording apparatus of the reception side.

The reproducing apparatus includes a tape 100 with data recorded thereon, a reproducing head 120, a demodulation unit 121 for reproduced data, an error correction unit 122, a transmission packet processing unit 123, a motor 124 for rotating the reproducing head, a phase detection unit 125 for the reproducing head, a phase control unit 126 for reproduction, and a motor control unit 127.

The recording apparatus includes a tape 200 for recording data, a recording head 220, a modulation unit 221 for data to be recorded, a sync block generation unit 222, a transmission packet processing unit 223, a motor 224 for rotating the recording head, a phase detection unit 225 for the recording head, a phase control unit 226 for recording, and a motor control unit 227.

In addition, it is a digital interface 300 such as IEEE 1394 capable of isochronous transmission that connects the reproducing side with the recording side.

The dubbing operation in the video transmission system of the present embodiment will now be described.

In the reproducing apparatus of the transmission side, digital data that are read out from the tape 100 through the reproducing head 120 are subjected to amplification and waveform shaping in the demodulation unit 121, and are reproduced as a digital data stream.

The error correction unit 122 performs error detection on the digital data stream on the unit basis of error correction encoded unit (sync block unit) having a predetermined length, and applies correction decoding if any error correction occurs, thereby recovering digital data as a predetermined unit of packet data. The transmission packet processing unit 123 then reassembles the packet data into a communication packet to output it to the digital interface 300.

Referring to the synchronization operation of the reproducing apparatus, a track scan phase of the reproducing head 120 rotated by the motor 124 is detected by the phase detection unit 125 for the reproducing head. The phase control unit 126 for reproduction detects a frame switching signal (FR signal) from the packet data recovered in units of sync blocks by the error correction unit 122, measures a difference between a timing based on the FR signal and a timing of the track scan phase detected by the phase detection unit 125 for the reproducing head, and sends the resulting error signal to the motor control unit 127.

The motor control unit 127 generates phase control information in response to the error signal, and performs acceleration/deceleration control on the rotation speed of the motor 124, thereby performing phase control on the reproducing head 120 (more precisely, the motor control unit 127 also performs rotation control on a capstan motor for conveying the tape 100). In short, the reproducing apparatus of the transmission side achieves head scan synchronously with the timing of the reference signal (FR signal) of the reproduced signal.

As described above, the reproducing apparatus is capable of reading the digital data recorded on the tape 100 and generating packet data in synchronization with the reproducing operation.

On the other hand, in the recording apparatus of the reception side, the transmission packet processing unit 223 analyzes header information, or the like in the communication packet transmitted from the reproducing apparatus through the digital interface 300 to generate a predetermined length of source packet data. The sync block generation unit 222 appends an error correcting code to the source packet data, and then generates sync block data to which sync information for data detection is further appended.

The modulation unit 221 performs digital modulation on a digital data stream of track image data assembled from a plurality of pieces of the sync block data, and applies waveform shaping and amplification to the digitally modulated track image data. The modulated digital data are then recorded on the tape 200 by the recording head 220.

Further, the synchronization operation of the recording apparatus will now be described.

The phase detection unit 225 for the recording head first detects a rotation phase of the motor 224 for rotating the recording head 220, thereby detecting a scan location of the recording head 220. The phase control unit 226 for recording detects a frame switching signal (FR signal) from the source packet data generated by the transmission packet processing unit 223, measures a difference between a timing based on the FR signal and the timing of the recording head phase detected by the phase detection unit 225 for the recording head, and sends the resulting error signal to the motor control unit 227.

The motor control unit 227 generates phase control information in response to the error signal, and performs acceleration/deceleration control on the rotation speed of the motor 224, thereby performing phase control on the recording head 220 (more precisely, the motor control unit 227 also performs rotation control on a capstan motor for conveying the tape 200). In short, the recording apparatus can achieve head scan of the recording apparatus in synchronization with the timing of the reference signal (FR signal) being recorded (dubbed). In other words, the recording apparatus is capable of generating the digital data of the track image recorded on the tape 200 in synchronization with the reference signal (FR signal) received from the reproducing apparatus.

As described above, according to the video transmission system of the present embodiment, each of the reproducing apparatus and the recording apparatus can generate an identical track pattern image on its tape by including the reference signal (FR signal) as synchronization information in the communication packet transmitted from the reproducing apparatus of the transmission side and received by the recording apparatus of the reception side.

Figure 3A:
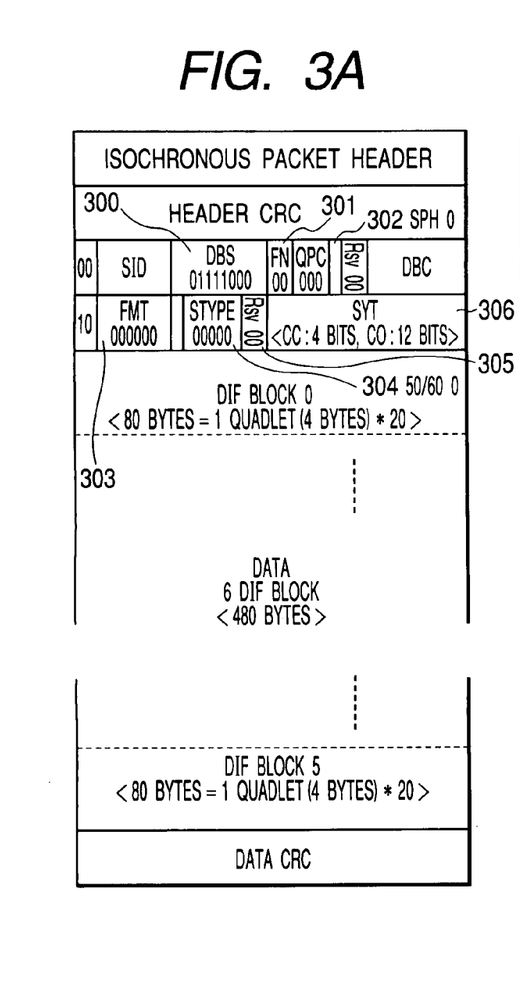
FIG. 3A is a diagram for illustrating a method of multiplexing synchronization information with a communication packet (an example of the DV system)
Figure 3B:
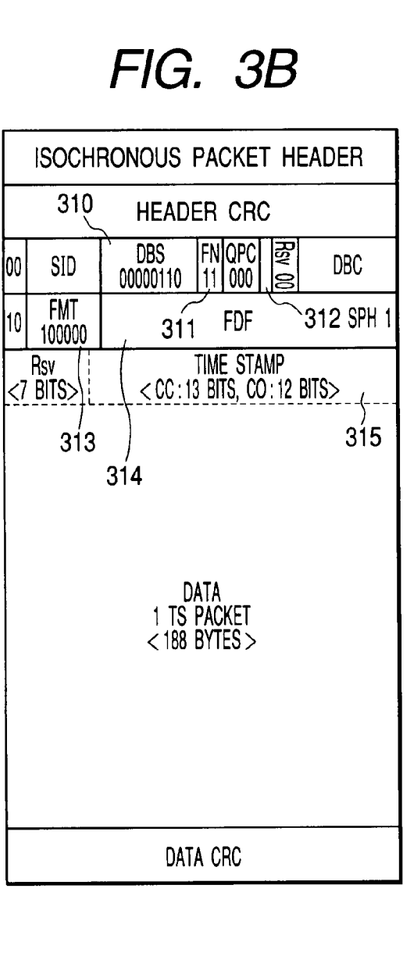
FIG. 3B is a diagram for illustrating a method of multiplexing synchronization information with a communication packet (an example of the MPEG system)
Figure 3C:
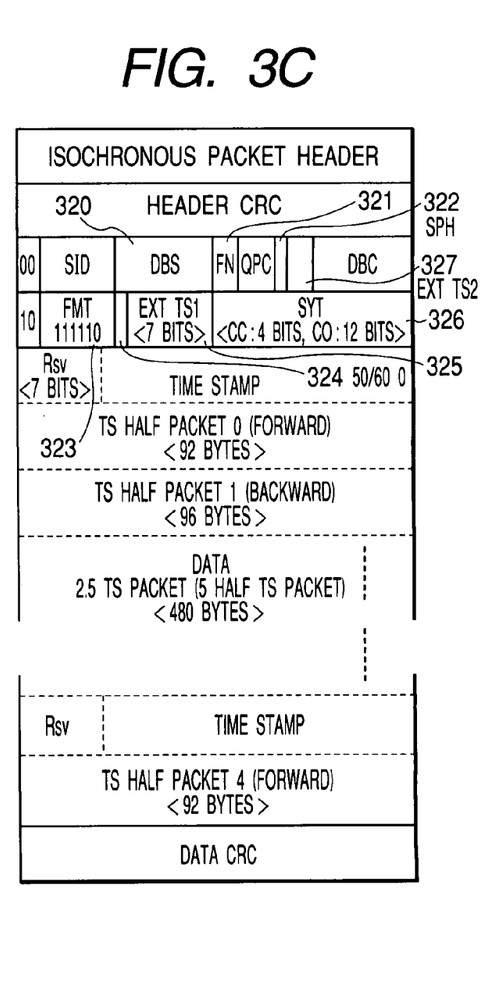
FIG. 3C is a diagram for illustrating a method of multiplexing synchronization information with a communication packet (an example of sharing between the DV system and the MPEG system)

Reference will now be made to FIGS. 3A, 3B and 3C to describe how the synchronization information is specifically multiplexed with the communication packet in the system as described above.

Each of FIGS. 3A, 3B, and 3C shows a specific configuration of the communication packet. FIG. 3A shows a configuration in communicating source packet data specific to the DV system, FIG. 3B shows a configuration in communicating one source packet (12.032 Mbps) of data specific to the MPEG system (MPEG-TS), and FIG. 3C shows a configuration in communicating source packet data available to the video transmission system of the present embodiment.

To outline the configuration of the communication packet, components of the communication packet will be described first. As shown in FIGS. 3A, 3B, and 3C, the communication packet begins with an isochronous packet header including a destination and other information, and an error correcting code (header CRC), followed by eight bytes of data designated CIP header. The four bytes of the first half are composed of data for the size of one data block of the source packet (300, 310, 320), the number of blocks constituting the source packet data (301, 311, 321), and the presence/absence of the source packet header (302, 312, 322).

For the DV system shown in FIG. 3A, the source packet is composed of one block of data with one data block being composed of 480 bytes. Accordingly, the data block size 300 contains $01111000_2$ (120 quadlets=480 bytes), 301 contains $00_2$ because the source packet data is not divided, and 302 contains $0_2$ because the source packet data has no header information.

On the other hand, for the MPEG system shown in FIG. 3B, one data block is composed of 24 bytes, and eight data blocks constitute a source packet (TS packet). Accordingly, the data block size 310 contains $00000110_2$ (6 quadlets=24 bytes), 311 contains $11_2$ because the source packet data is composed of eight data blocks, and 312 contains $1_2$ because the source packet data has header information including synchronization information described below.

The four bytes of the second half are composed of data such as format information (303, 313, 323) and information concerning the format data (304, 305, 306, 314, 324, 325, 326).

For the DV system shown in FIG. 3A, the format information 303 contains $000000_2$ indicating the DV system. The information concerning the format is composed of frame period information 304 ($0_2$ for NTSC indicating 60 Hz), image format information 305 ($00000_2$ for NTSC indicating the standard image), and synchronization information 306. The synchronization information for the DV system is composed of a cycle offset having twelve bits and a cycle count having four bits as described below.

On the other hand, for the MPEG system shown in FIG. 3B, the format information 313 contains $100000_2$ indicating the MPEG system (DVB system), and the information concerning the format contains $00000000000000000000000_2$ indicating no such specific information. However, for the MPEG system, the source packet data includes header information. The least significant 25 bits 315 of the header information contains synchronization information similar to that for the DV system. The synchronization information 315 is composed of a cycle offset having twelve bits and a cycle count having thirteen bits as described below. As a result, the bit length of the cycle count for the MPEG system is longer than that for the DV system by nine bits.

The configuration of the synchronization information will now be described. The synchronization information is composed of: cycle offset bits for measurement a synchronization packet communication interval of 125 μsec with a reference clock 24.576 MHz of the digital interface; and cycle count bits for measurement 1 sec with the number of packet communications. Since the cycle offset bits are used for measurement up to 125 μsec, the measurement value ranges up to 125E-6×24.576E6=3072. That is, it is sufficient to use only twelve bits.

On the other hand, the bit length of the cycle count bits is determined by the jitter tolerance of the synchronized data. As compared with the DV system of fixed-length encoding, the MPEG system of variable-length encoding has narrower tolerance owing to the constraint on buffer control (in the present embodiment, the broadest jitter tolerance range corresponds to the DV system, and the narrowest jitter tolerance range corresponds to the MPEG system). Therefore, the synchronization information is detected with higher precision using thirteen bits, being nine bits longer than the four bits for the DV system.

Reference will now be made to FIG. 3C for describing the configuration of a communication packet in the case of communicating source packet data available to the video transmission system of the present embodiment, i.e., the configuration of a communication packet into which synchronization information which can be shared between the DV system and the MPEG system is incorporated. Such a communication packet is generated by the reproducing apparatus of the transmission side (specifically, the transmission packet processing unit 123 shown in FIG. 1) and is transmitted to the recording apparatus of the reception side.

The communication packet shown in FIG. 3C can be used to communicate a data stream including MPEG data and DV data in a mixed manner at the time of dubbing in the video transmission system. In order to enable its use in such a special mode as dubbing, a vendor-unique value of $111110_2$ is assigned to the format information field 323 as the information indicating the special communication mode.

Regarding the synchronization information, the time stamp information for the DV system (synchronization information field 306) is used as it is in the field 326, while the nine bits of synchronization information added for the MPEG system are divided to be embedded in the field 325 (corresponding to seven bits composed of the image format information 305 for the DV system and subsequent reserve bits), and in the reserved two-bit field 327 in the first half of the CIP header. In this manner, the additional nine bits of synchronization information described above are embedded in the fields which are not used in the normal recording mode for digital data.

At the time of the dubbing mode, the values in the synchronization information fields 326, 325, and 327 described above are consistently used irrespective of whether the encoding scheme is the DV or MPEG system. This enables the dubbing operation to continue without disturbing the synchronization information even if the encoding method is switched halfway, provided that the transmission rate is generally constant (assumption that the recording rate does not vary between the standard image DV system and the high-quality image MPEG system).

In the present embodiment, the synchronization information field 326 for the DV system is left as it is. Thus, a smooth transition can be achieved from the synchronization control for the normal DV system to the synchronization control for the dubbing mode of the present embodiment. Furthermore, in the present embodiment, all of the commonly used synchronization information are multiplexed with the fields in the CIP header which is available in the data transfer for the DV system. Therefore, it is needless to say that synchronization processing with high precision can be achieved during the data transmission in the DV system at the time of dubbing. Moreover, the mode transition to the data transmission in the MPEG system can be performed seamlessly.

In addition, with regard to the source packet length, matching the source packet length for the MPEG system with the source packet length for the DV system eliminates fluctuation in the cycle of the synchronization information. Specifically, in FIG. 3C, if the source packet length for the MEPG scheme is set to 2.5 TS packet length, the data sizes in a unit packet transmission is equal. To achieve this, a TS packet needs to be divided into half packets. Specifically, if one data block size is set to twelve bytes, and eight data blocks constitute a half packet (half TS packet), the data block size 320 contains $00000011_2$ (3 quadlets=12 bytes), one source packet of data is composed of eight data blocks, and 311 contains $11_2$. Accordingly, if five source packet units constitute packet data, the packet data has a length of 12×8×5=480 bytes.

Figure 4:
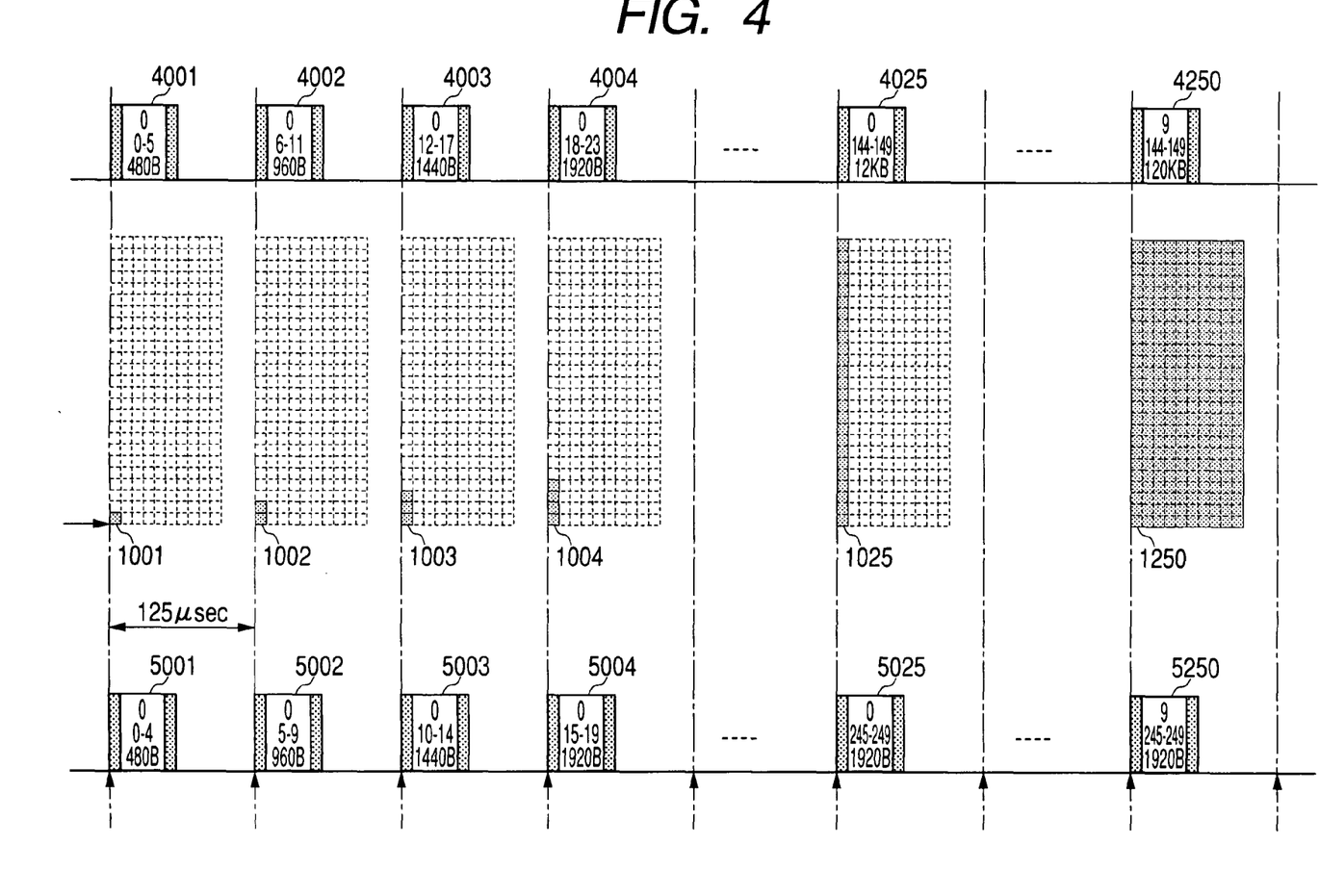
FIG. 4 is a diagram for illustrating a relationship between communication data and recorded patterns for the DV system and the MPEG system.

The relationship between the communication data and the recording pattern at this point for the DV system and the MPEG system will be described with reference to FIG. 4. In FIG. 4, a horizontal axis is a time axis, and a dash-dotted vertical axis is depicted for each packet communication interval. The top portion of the figure shows communication packets for the DV system, and the bottom portion of the figure represents communication packets for the MPEG system. The middle portion of the figure shows a conceptual diagram of the recording pattern.

First, in the DV system, one source packet is composed of 480 bytes. In the DV format, this corresponds to the unit of six DIF blocks. In the above-mentioned DV format, one track is composed of 150 DIF blocks, and one frame is composed of ten tracks. Therefore, when one packet communication (4001) is completed, six DIF blocks of data are communicated, and six DIF blocks of data in track 0 (1001) are recorded.

In the following packet communication, six DIF blocks of data are communicated again. Thus, the data (1002) are recorded. When this packet communication has been repeated 25 times (4025), the data of (1025) are recorded to form one track. Furthermore, when the packet communication has been repeated 250 times (4250), the data of (1250) will be recorded, and ten tracks, i.e., one frame of data will be written. In this description, for simplicity, padding and other operations for synchronization adjustment are not described. In practice, the above-mentioned synchronization information will be utilized to perform the above communication and write operation for the track area in synchronization with the recorded location of the track.

Next, the MPEG system will be described. In the MPEG system, if the recording is performed in units of TS packets, the TS packet is divided into half packets, and then the recording operation is performed in units of half packets. First, in the initial communication packet, five half packets are communicated (5001) and are recorded in the recording area (1001).

Also in the next communication packet, five half packets are communicated (5002) and recorded in the recording area (1002). When this operation has been repeated 25 times (5025), the data of (1025) are recorded to form one track. Furthermore, when the operation has been repeated 250 times (5250), the data of (1250) will be recorded, and thereby ten tracks will be written.

In the case of the MPEG system, which uses variable-length encoding using interframe compression, ten tracks does not constitute one frame of image. The unit in which the variable-length encoding is converted into fixed-length encoding is a unit called GOP composed of fifteen frames of image. Therefore, if the start of data of the intraframe-encoded picture (I picture) in the leading frame of the GOP is aligned with the leading edge of the FR signal, synchronization in the same cycle as that of the DV system can be established. In the DV system, the system of the transmission side multiplexes the FR signal with the packet data at one frame interval. In the MPEG system, the system of the transmission side multiplexes the FR signal with the intraframe-encoded picture in the leading frame of the GOP.

In this manner, according to the present embodiment, by sharing synchronization information data for the packet data, the synchronization relation is not disturbed even if data streams of different formats are conveyed at the time of dubbing operation.

Furthermore, according to the present embodiment, the amount of data communication in an each predetermined interval is set to a nearly equal to each other. Therefore, there is no change of transmission rate due to mode switching between the DV system and the MPEG system, thereby avoiding disturbance in the synchronization of the system.

In addition, according to the present embodiment, the preset of the reference value for the synchronization information is performed in the intraframe-encoded image (I picture or DV system), and the reference value for the synchronization information is updated at a cycle of a unit of ten tracks (corresponding to one frame of image data in the DV system). Therefore, no phase shift occurs at the time of mode switching between the DV system and the MPEG system, thereby avoiding disturbance in the synchronization of the system.

Figure 5A:
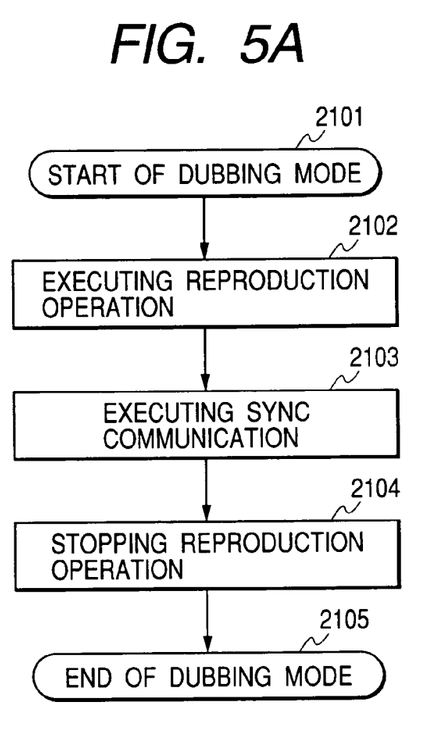
FIG. 5A is a flow chart showing a flow of processing during the dubbing operation of the transmission side of a video transmission system according to the present invention.

Finally, the process flow at the time of dubbing operation of the present embodiment will be described with reference to the flow charts shown in FIGS. 5A and 5B. FIG. 5A shows the flow on the transmission side, and FIG. 5B shows the flow on the reception side.

In FIG. 5A, at first, in the reproducing apparatus of the transmission side, a dubbing mode is set and then is started (step 2101). A control register for the protocol is set to the dubbing mode (FMT $111110_2$). When the reproduction operation is executed (step 2102), the synchronization of the system of the reproducing side is established. The synchronization data (FR signal) is then detected, and synchronization information (time stamp information) is generated. The time stamp information is used to generate packet data with additional time stamp information being embedded in the CIP header, whereby synchronization communication is executed (step 2103). When the reproduction operation is stopped (step 2104), the dubbing mode is terminated (step 2105), and the special state of data transmission is deactivated.

Figure 5B:
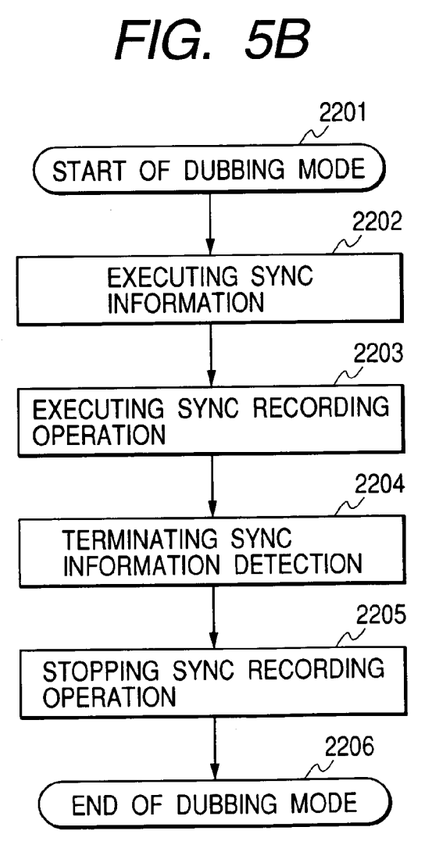
FIG. 5B is a flow chart showing a flow of processing during the dubbing operation of the reception side of a video transmission system according to the present invention.

On the other hand, in FIG. 5B, with regard to the operation at the time of dubbing in the recording apparatus of the reception side, the dubbing mode is started by detecting the header information FMT $111110_2$ in the received data (step 2201). Subsequently, the detection field for synchronization information is detected from the consistent fields (SYT (326 shown in FIG. 3C), Ext TS1 (325 shown in FIG. 3C), Ext TS2 (327 shown in FIG. 3C) irrespective of the encoding method of the communication data (step 2202). A synchronization relation of the recording apparatus is established by detecting the synchronization information, and then synchronized recording operation is executed (step 2203). When the data communication is terminated and the detection of synchronization information is completed (step 2204), the synchronized recording operation is stopped (step 2205). Finally, the dubbing mode is terminated (step 2206).

The description of the flows shown in FIGS. 5A and 5B is as described above.

As described above, the present embodiment addresses dubbing of a data stream which includes a mixture of digital data of the time series having substantially equal recording rates but being based on different encoding method. When the dubbing is performed, synchronization has been established using information having synchronization information in common fields and having stricter condition for establishing synchronization (information having a longer bit length), and packets are reconfigured so that the communication data amount of the packet data may be nearly equal. Therefore, the present embodiment achieves the effect of avoiding disturbance in the synchronization of the recording and reproducing system due to the switching of data streams.

Furthermore, while the present embodiment provides the common synchronization information in some fields in the CIP header, the common synchronization information may be provided in the source packet header. The latter case also achieves a substantially similar effect, although some degree of disturbance in synchronization may occur at the time of transition to the dubbing mode.

Furthermore, the DV data of normal image quality (SD format) and HD data of high image quality (DVB 25 Mbps) are used as an example for description. However, the present invention is also applicable to similar systems in which recording rates are nearly equal, with encoding methods being different, and the data to be synchronized with packet communication are multiplexed with different fields. This also achieves an effect similar to that for the above embodiment.

Furthermore, the object of the present invention is also achieved, of course, by supplying a system or apparatus with a storage medium on which a program code of software implementing the functions of the above-described embodiment is recorded, and by causing a computer (or CPU or MPU) of the system or apparatus to read and execute the program code stored in the storage medium.

In this case, the program code itself read out from the storage medium will implement the functions of the above-described embodiment, and the program code itself and the storage medium storing the program code will constitute the present invention.

As a storage medium for supplying the program code, for example, a flexible disk, hard disk, optical disk, magneto-optical disk, CD-ROM, CD-R, magnetic tape, nonvolatile memory card, and ROM can be used.

Furthermore, by causing a computer to execute the program code read out therefrom, not only are the functions of the above-described embodiment achieved, but also, of course, the OS (basic system or operating system) running on the computer may execute a part or all of actual processing based on instructions of the program code, thus implementing the functions of the above-described embodiment by the processing.

Moreover, of course, the program code read from the storage medium may be written in an expansion board inserted into the computer or in a memory provided in an expansion unit connected to the computer. Then the CPU etc. provided in the expansion board or expansion unit may execute a part or all of actual processing based on instructions of the program code, thus implementing the functions of the above-described embodiment by the processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. A video transmission system for transmitting a plurality of compressed video data compressed by different video compression systems and recorded on a recording medium, respectively, comprising:

reproducing means for reproducing, from the recording medium, a data stream which includes mixed compressed video data so that the reproduced data stream mixedly includes (a) compressed video data compressed by a first video compression system and (b) compressed video data compressed by a second video compression system different from the first compression system, wherein the first and second video compression systems compress video data using different respective compression methods;

synchronization information generation means for generating synchronization information of the data stream reproduced by said reproducing means so that the synchronization information includes synchronization information corresponding to the compressed video data compressed by the first video compression system and synchronization information corresponding to the compressed video data compressed by the second video compression system;

transmission packet generation means for generating a transmission packet which includes a plurality of fields for storing the synchronization information generated by said synchronization information generation means, to transmit the data stream mixedly including the compressed video data compressed by the first video compression system and the compressed video data compressed by the second video compression system;

transmission means for generating packet data so that divisional data divided from the data stream reproduced by said reproducing means is embedded in the transmission packet generated by said transmission packet generation means and the synchronization information generated by said synchronization information generation means is embedded dividedly in a different field in accordance with the first and second video compression systems, and transmitting the generated packet data; and recording control means for controlling recording operation of the data stream transmitted as the packet data by said transmission means, according to the synchronization information, wherein the transmission packet is a common isochronous packet, wherein the synchronization information corresponding to the compressed video data compressed by the first video compression system is stored in some but not all of the fields used to store the synchronization information corresponding to the compressed video data compressed by the second video compression system, wherein the synchronization information corresponding to the compressed video data compressed by the first video compression system comprises a 4 bit cycle count and a 12 bit cycle offset, both stored in a first field in a header of the common isochronous packet, and wherein the synchronization information corresponding to the compressed video data compressed by the second video compression system comprises a 13 bit cycle count and a 12 bit cycle offset, which are collectively stored in three fields in the header of the common isochronous packet, including the first field and two other fields.

2. A system according to claim 1, wherein said transmission means transmits the packet data with identification information for identifying that the compressed video data is to be recorded in a predetermined recording medium, multiplexed with the packet data.

3. A system according to claim 2, wherein said transmission means performs isochronous communication as standardized in IEEE 1394, and multiplexes at least one of the synchronization information and the identification information into a Common Isochronous Packet (CIP) header of the packet data.

4. A system according to claim 1, wherein said transmission means multiplexes a reference signal for the synchronization information with the packet data at an interval of a predetermined number of frames.

5. A system according to claim 4, wherein the data stream reproduced by said reproducing means includes the compressed video data compressed by an MPEG system, and said transmission means multiplexes the reference signal with the packet data corresponding to a leading frame of a Group Of Pictures (GOP).

6. A system according to claim 4, wherein the data stream reproduced by said reproducing means includes the compressed video data compressed by an SD system, and said transmission means multiplexes the reference signal with the packet data at an interval of one frame.

7. A system according to claim 1, wherein an amount of the packet data is equal among the plurality of compressed video data.

8. A system according to claim 1, wherein the first video compression system uses compression for DV video, and
wherein the second video compression system uses compression for MPEG video.

9. A transmission apparatus for transmitting a plurality of compressed video data compressed by different video compression systems and recorded on a recording medium, respectively, comprising:

reproducing means for reproducing, from the recording medium, a data stream which includes mixed compressed video data so that the reproduced data stream mixedly includes (a) compressed video data compressed by a first video compression system and (b) compressed video data compressed by a second video compression system different from the first compression system, wherein the first and second video compression systems compress video data using different respective compression methods;

synchronization information generation means for generating synchronization information of the data stream reproduced by said reproducing means so that the synchronization information includes synchronization information corresponding to the compressed video data compressed by the first video compression system and synchronization information corresponding to the compressed video data compressed by the second video compression system;

transmission packet generation means for generating a transmission packet which includes a plurality of fields for storing the synchronization information generated by said synchronization information generation means, to transmit the data stream mixedly including the compressed video data compressed by the first video compression system and the compressed video data compressed by the second video compression system; and transmission means for generating packet data so that divisional data divided from the data stream reproduced by said reproducing means is embedded in the transmission packet generated by said transmission packet generation means and the synchronization information generated by said synchronization information generation means is embedded dividedly in a different field in accordance with the first and second video compression systems, and transmitting the generated packet data, wherein the transmission packet is a common isochronous packet, wherein the synchronization information corresponding to the compressed video data compressed by the first video compression system is stored in some but not all of the fields used to store the synchronization information corresponding to the compressed video data compressed by the second video compression system, wherein the synchronization information corresponding to the compressed video data compressed by the first video compression system comprises a 4 bit cycle count and a 12 bit cycle offset, both stored in a first field in a header of the common isochronous packet, and wherein the synchronization information corresponding to the compressed video data compressed by the second video compression system comprises a 13 bit cycle count and a 12 bit cycle offset, which are collectively stored in three fields in the header of the common isochronous packet, including the first field and two other fields.

10. An apparatus according to claim 9, wherein said transmission means transmits the packet data with identification information for identifying that the compressed video data is to be recorded in a predetermined recording medium, being multiplexed with the packet data.

11. An apparatus according to claim 10, wherein said transmission means performs isochronous communication as standardized in IEEE 1394, and multiplexes at least one of the synchronization information and the identification information into a CIP header of the packet data.

12. An apparatus according to claim 9, wherein said transmission means multiplexes a reference signal for the synchronization information with the packet data at an interval of a predetermined number of frames.

13. An apparatus according to claim 12, wherein the data stream reproduced by said reproducing means includes the compressed video data compressed by an MPEG system, and said transmission means multiplexes the reference signal with the packet data corresponding to a leading frame of a GOP.

14. An apparatus according to claim 12, wherein the data stream reproduced by said reproducing means includes the compressed video data compressed by an SD system, and said transmission means multiplexes the reference signal with the packet data at an interval of one frame.

15. An apparatus according to claim 9, wherein an amount of the packet data is equal among the plurality of compressed video data.

16. A method of establishing synchronization in transmission of a plurality of compressed video data compressed by different video compression systems and recorded on a recording medium, respectively, among a plurality of apparatuses, comprising the steps of:

reproducing, from the recording medium, a data stream which includes mixed compressed video data so that the reproduced data stream mixedly includes (a) the compressed video data compressed by a first video compression system and (b) the compressed video data compressed by a second video compression system different from the first compression system, wherein the first and second video compression systems compress video data using different respective compression methods;

generating synchronization information of the data stream reproduced in said reproducing step so that the synchronization information includes synchronization information corresponding to the compressed video data compressed by the first video compression system and synchronization information corresponding to the compressed video data compressed by the second video compression system;

generating a transmission packet which includes a plurality of fields for storing the synchronization information generated in said synchronization information generating step, to transmit the data stream mixedly including the compressed video data compressed by the first video compression system and the compressed video data compressed by the second video compression system;

generating packet data so that divisional data divided from the data stream reproduced in said reproducing step is embedded in the transmission packet generated in said transmission packet generating step and the synchronization information generated in said synchronization information generation step is embedded dividedly in a different field in accordance with the first and second video compression systems, and transmitting the generated packet data; and controlling recording operation of the data stream transmitted as the packet data in said transmitting step, based on the synchronization information, wherein the transmission packet is a common isochronous packet, wherein the synchronization information corresponding to the compressed video data compressed by the first video compression system is stored in some but not all of the fields used to store the synchronization information corresponding to the compressed video data compressed by the second video compression system, wherein the synchronization information corresponding to the compressed video data compressed by the first video compression system comprises a 4 bit cycle count and a 12 bit cycle offset, both stored in a first field in a header of the common isochronous packet, and wherein the synchronization information corresponding to the compressed video data compressed by the second video compression system comprises a 13 bit cycle count and a 12 bit cycle offset, which are collectively stored in three fields in the header of the common isochronous packet, including the first field and two other fields.

17. A method according to claim 16, wherein said transmitting step performs isochronous communication as standardized in IEEE 1394, and multiplexes the synchronization information into a CIP header of the packet data.

18. A method according to claim 16, wherein said transmitting step multiplexes a reference signal for the synchronization information with the packet data at an interval of a predetermined number of frames.

19. A method according to claim 16, wherein an amount of the packet data is equal among the plurality of compressed video data.

* * * * *